UNITED STATES PATENT OFFICE.

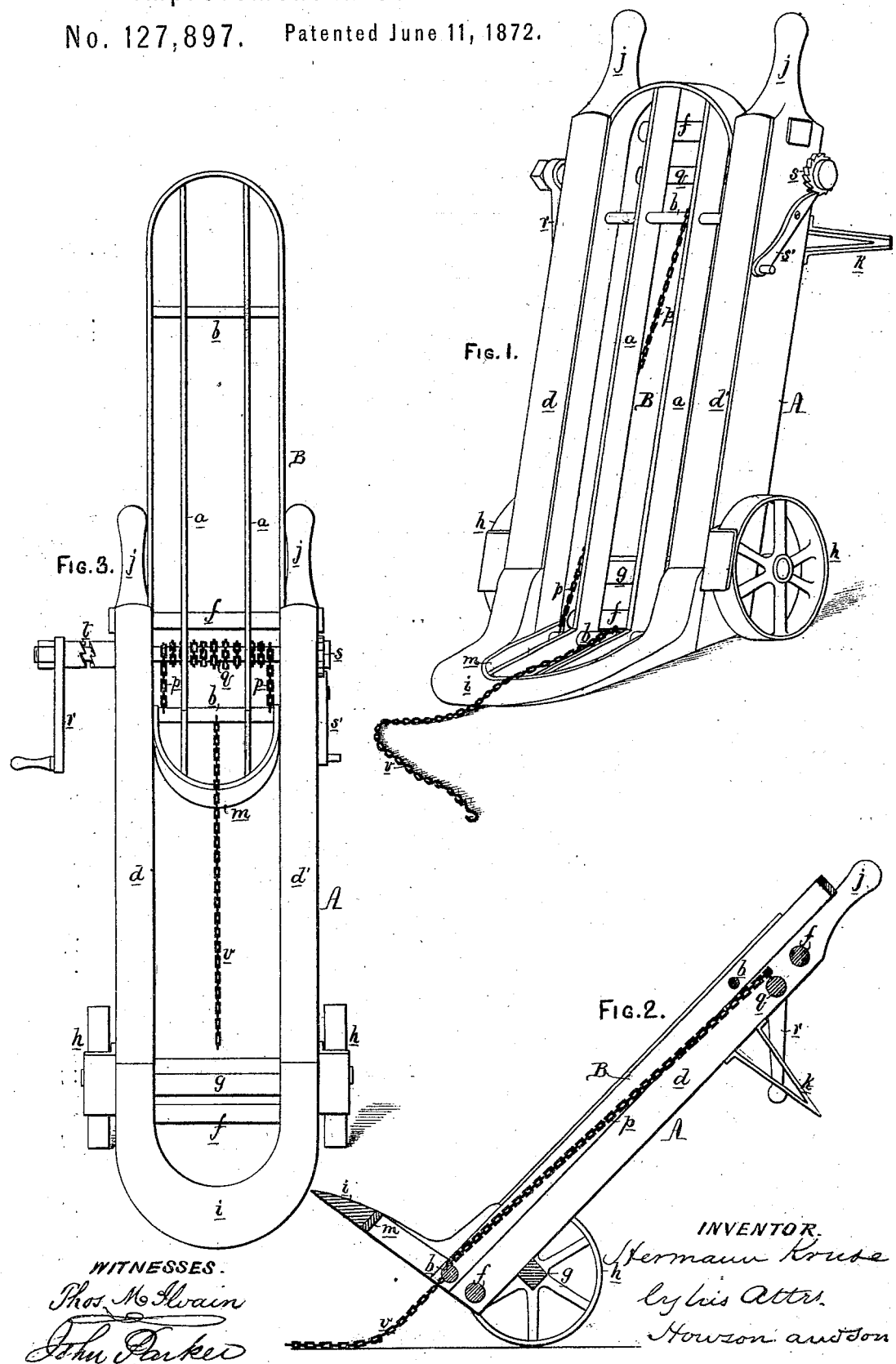

HERMANN KRUSE, OF PHILADELPHIA, PENNSYLVANIA, ASSIGNOR TO HIMSELF AND AUGUSTUS KRUEGER, JR., OF SAME PLACE.

IMPROVEMENT IN COMBINED TRUCKS AND HOISTS.

Specification forming part of Letters Patent No. 127,897, dated June 11, 1872.

Specification describing a Combined Truck and Hoist, invented by HERMANN KRUSE, a native of Prussia, but now residing in Philadelphia, county of Philadelphia, and State of Pennsylvania.

Combined Truck and Hoist.

My invention consists of a truck with which is combined a hoist, in a manner too fully explained hereafter to need preliminary description; the object of my invention being to render a truck available as a means of hoisting a load to the height of a dray or wagon, into which it has to be deposited.

In the accompanying drawing, Figure 1 is a perspective view of my combined truck and hoist; Fig. 2, a sectional view of the same; and Fig. 3, a front view, showing the hoist elevated.

A represents the truck, and B the hoist, the latter consisting of a strong metal frame rounded at each end, and braced by longitudinal and transverse bars, $a$ and $b$, the opposite sides of the frame being parallel, and being adapted to and arranged to slide in guides formed in the inner edges of the side frames $d\ d'$ of the truck. The truck is of the same general form as those in common use for carrying heavy boxes and bales of goods to and from vehicles, and for shifting them in warehouses, &c. The side frames are secured together, by cross-pieces $f f$, by an axle, $g$, upon which the wheels $h\ h$ of the truck turn freely, and by a curved metal yoke, $i$, which projects upward and outward from the front end of the truck at such an angle as to support the latter when elevated to the inclined position shown in Fig. 1. This yoke is also reduced to a comparatively sharp edge in front, so that it may, when the truck is raised, be introduced beneath a box or bale, as a preliminary to tilting the latter over onto the said truck. At its opposite end the truck has handles $j j$, and feet $k$. The curved front end $m$ of the hoist B projects at an angle corresponding to that of the yoke $i$ of the truck, and is arranged to be fitted snugly within the same, so as to be flush with the said yoke, as shown in Figs. 1 and 2. The hoist is connected by a chain or chains, $p$, to a shaft, $q$, which extends transversely across and turns in the side frames of the truck, one end of the said shaft being provided with a crank, $r$, by which it may be turned in order to wind in the chain and thus elevate the hoist, as shown in Fig. 3, there being at the opposite end of the said shaft a ratchet-wheel, $s$, which, with a lever-pawl, $s'$, hung to the truck, prevents the shaft from turning in such a direction as to permit the unwinding of the chain and descent of the hoist until the pawl is disengaged from the teeth of the ratchet-wheel. The crank $r$ is hung loosely to and has a sliding motion upon the shaft, but can be instantly locked to the same by a clutch-connection, $t$, the latter being of such a character, however, as to permit the said shaft to be turned in one direction only by the crank.

The combined truck and hoist can be used for all the purposes of an ordinary truck; but it is intended especially to enable heavy boxes or packages of goods to be carried for short distances to a wagon or dray, and to be then elevated to the height of and deposited upon the dray without requiring any of the usual laborious lifting, demanding the assistance of several attendants.

The method of operation is as follows: The truck is first brought close up to the box or bale, and is then elevated, as shown in Fig. 1, when its yoke $i$, and the end or foot $m$ of the hoist are inserted beneath the said box, to permit which the latter is slightly inclined or tilted. The truck is then lowered, and the box or bale thrown over onto the same in the usual manner, after which the truck with its load is wheeled to the vehicle into which the box is to be lifted. The truck having been brought as close as possible to the vehicle is again elevated to the position shown in Fig. 1, so that it may rest upon the front of the yoke $i$—which forms a broad and firm base for its support—after which the crank $r$ is turned in order to wind the chains $p$ upon the shaft $q$. This will cause the hoist B to be raised in the guides of the truck, and the box to be consequently lifted, as the bent end or foot $m$ of the hoist extends beneath and supports the said box. When the box has been thus raised to the required height, it can, by a very slight effort, be turned over onto the wagon.

After unloading the truck the pawl $s'$ is disengaged from the teeth of the ratchet-wheel s, when the hoist will, by its own weight, slide downward to its original position on the truck. As the hoist thus descends and the chains are unwound from the shafts q, the latter will be rapidly rotated; but the crank r, owing to its method of connection, will hang loosely during this reverse movement, whereas, if it were secured rigidly to the shaft it might, by its rapid rotation, strike and injure the attendant or a passer by. Another advantage of the loosely-connected crank is, that it will hang down out of the way and not interfere with the loading or unloading of the truck.

One or more chains or straps, v, may be attached to the hoist for the purpose of securing packages to the same while being hoisted.

I claim as my invention—

1. The combination, substantially as herein described, of a truck and hoist.

2. The combination, with a truck, of the sliding frame B, the chain-shaft q, and pawl and ratchet, or the equivalent thereof, for the purpose specified.

3. The combination of the truck, slide, and chain-shaft, and the crank r and its clutch t, as specified.

In testimony whereof I have signed my name to this specification in the presence of two subscribing witnesses.

HERMANN KRUSE.

Witnesses:
WM. A. STEEL,
JOHN K. RUPERTUS.